United States Patent
Sawada et al.

(10) Patent No.: US 10,187,472 B2
(45) Date of Patent: Jan. 22, 2019

(54) MASTER DEVICE, SLAVE DEVICE, INFORMATION PROCESSING DEVICE, EVENT LOG COLLECTING SYSTEM, CONTROL METHOD OF MASTER DEVICE, CONTROL METHOD OF SLAVE DEVICE AND CONTROL PROGRAM

(71) Applicant: OMRON Corporation, Kyoto (JP)

(72) Inventors: Shigenori Sawada, Takatsuki (JP); Taishi Kawaguchi, Kyoto (JP); Yasushi Yamawaki, Kusatsu (JP); Kojiro Baba, Kusatsu (JP)

(73) Assignee: OMRON Corporation, Kyoto (JP)

( * ) Notice: Subject to any disclaimer, the term of this patent is extended or adjusted under 35 U.S.C. 154(b) by 231 days.

(21) Appl. No.: 15/381,128

(22) Filed: Dec. 16, 2016

(65) Prior Publication Data
US 2017/0251059 A1 Aug. 31, 2017

(30) Foreign Application Priority Data
Feb. 26, 2016 (JP) .................. 2016-036447

(51) Int. Cl.
*G06F 15/16* (2006.01)
*H04L 29/08* (2006.01)
(Continued)

(52) U.S. Cl.
CPC .......... *H04L 67/125* (2013.01); *G05B 19/054* (2013.01); *H04J 3/0652* (2013.01);
(Continued)

(58) Field of Classification Search
CPC ... H04L 67/125; H04L 41/12; H04L 67/1095; G05B 19/0426; G05B 2219/2231;
(Continued)

(56) References Cited

U.S. PATENT DOCUMENTS 8,165,479 B2 * 4/2012 Mizuno .............. G06F 11/3476
399/10
8,423,507 B2 * 4/2013 Yamada .............. G06F 11/1662
707/614

(Continued)

FOREIGN PATENT DOCUMENTS

CN 1918940 2/2007
CN 1931530 3/2007
(Continued)

OTHER PUBLICATIONS

"Search Report of Europe Counterpart Application", dated Jun. 20, 2017, p. 1-p. 9.
(Continued)

*Primary Examiner* — Moustafa M Meky
(74) *Attorney, Agent, or Firm* — JCIPRNET

(57) ABSTRACT

The invention is adapted to acquire more useful log data. A master device (4) includes a timer element (45), adapted to acquire a moment; an instruction sending element (421), adapted to synchronize a moment measured by a slave timer element (14) of slave devices (1-3) with a moment acquired by the timer element (45) according to a time synchronization instruction containing moment information corresponding to the moment acquired by the timer element (45); and a slave log receiving element (423), adapted to receive slave logs (131).

12 Claims, 7 Drawing Sheets

(51) Int. Cl.
    *H04L 12/24* (2006.01)
    *G05B 19/05* (2006.01)
    *H04J 3/06* (2006.01)
    *G05B 19/042* (2006.01)
(52) U.S. Cl.
    CPC .......... *H04L 41/12* (2013.01); *H04L 67/1095* (2013.01); *G05B 19/0426* (2013.01); *G05B 2219/2231* (2013.01); *G05B 2219/2236* (2013.01); *G05B 2219/31462* (2013.01); *G05B 2219/34413* (2013.01); *H04J 3/0655* (2013.01)
(58) Field of Classification Search
    CPC .. G05B 2219/2236; G05B 2219/31462; G05B 2219/34413
    See application file for complete search history.

(56) References Cited

U.S. PATENT DOCUMENTS

| | | | |
|---|---|---|---|
| 2005/0180466 | A1 | 8/2005 | Franchuk et al. |
| 2008/0079595 | A1 | 4/2008 | Baier et al. |
| 2016/0112516 | A1* | 4/2016 | Liu .................... H04L 67/1097 709/223 |

FOREIGN PATENT DOCUMENTS

| | | |
|---|---|---|
| CN | 102217326 | 10/2011 |
| EP | 2538290 | 12/2012 |
| JP | H0496115 | 3/1992 |
| JP | 2007527667 | 9/2007 |
| JP | 2010113553 | 5/2010 |
| JP | 2011-216085 | 10/2011 |
| JP | 2012508926 | 4/2012 |
| JP | 2014071574 | 4/2014 |
| JP | 2015035158 | 2/2015 |
| WO | 2010056246 | 5/2010 |

OTHER PUBLICATIONS

Kenji Kitayama et al., "A study on time synchronization for ring networks", IEICE Technical Report, Nov. 2010, with English abstract, pp. 1-8.

"Notification of Reasons for Refusal of Japan Counterpart Application," dated Jul. 24, 2018, with English translation thereof, p. 1-p. 7.

"Office Action of China Counterpart Application," dated Nov. 21, 2018, with English translation thereof, pp. 1-36.

* cited by examiner

| Moment of master device 4 | Event name |
|---|---|
| 2016/2/10 12:00:00 | AAAAAA |
| 2016/2/10 12:10:00 | BBBBBB |
| 2016/2/10 12:15:00 | CCCCCC |
| ⋮ | ⋮ |

| Moment of slave device 1 | Event name |
|---|---|
| 2016/2/10 12:00:00 | aaaaaa |
| 2016/2/10 12:20:00 | dddddd |
| ... | ... |

| Moment of slave device 2 | Event name |
|---|---|
| 2016/2/10 12:00:00 | aaaaaa |
| 2016/2/10 12:10:00 | bbbbbb |
| ... | ... |

| Moment of slave device 3 | Event name |
|---|---|
| 2016/2/10 12:10:00 | bbbbbb |
| 2016/2/10 12:30:00 | eeeee |
| ... | ... |

FIG. 4

| Generation moment | Generation source | Event name |
|---|---|---|
| 2016/2/10 12:00:00 | Master device | AAAAAA |
| 2016/2/10 12:00:00 | Slave device 1 | aaaaaa |
| 2016/2/10 12:00:00 | Slave device 2 | aaaaaa |
| 2016/2/10 12:10:00 | Master device | BBBBBB |
| 2016/2/10 12:10:00 | Slave device 2 | bbbbbb |
| 2016/2/10 12:10:00 | Slave device 3 | bbbbbb |
| 2016/2/10 12:15:00 | Master device | CCCCCC |
| 2016/2/10 12:20:00 | Slave device 2 | dddddd |
| 2016/2/10 12:30:00 | Slave device 3 | eeeeee |

FIG. 5

MASTER DEVICE, SLAVE DEVICE, INFORMATION PROCESSING DEVICE, EVENT LOG COLLECTING SYSTEM, CONTROL METHOD OF MASTER DEVICE, CONTROL METHOD OF SLAVE DEVICE AND CONTROL PROGRAM

CROSS-REFERENCE TO RELATED APPLICATION

This application claims the priority benefit of Japanese application serial no. 2016-036447, filed on Feb. 26, 2016. The entirety of the above-mentioned patent application is hereby incorporated by reference herein and made a part of this specification.

BACKGROUND OF THE INVENTION

Field of the Invention

The invention relates to a slave device, a master device controlling the slave device, and an information processing device transceiving data to/from the master device, etc.

Description of Related Art

A plurality of industrial network systems is designed in the past, where the industrial network system generally includes slave devices adapted to perform data collection and control to production devices in a manufacturing plant, and a master device adapted to perform centralized management to the slave devices. A topology of the master device and the slave devices is diversified based on collaboration and wiring relationships of the slave devices or the production devices implementing data collection and controlling by the slave devices. The master device and the slave devices implement connectionless communication through Ethernet for control automation technology (EtherCAT, registered trademark).

EXISTING TECHNICAL LITERATURE

Patent Literature

Patent literature 1: Japan Patent publication No. 2011-216085 (published on Oct. 27, 2011)

SUMMARY OF THE INVENTION

Problem to be Resolved by the Invention

Generally, a slave device has an internal counter, which counts a time started from power-on only through a count function of the counter, and the slave device may only recognize a moment serving as a count value of the internal counter. Namely, in the slave device, the time is counted based on a reference different to the time measured by a general timer, so that even if some data is recorded in the slave device, since an acquiring time of the data is a count value counted by the internal counter, it is hard to objectively learn the time when the data is acquired.

Serving as an improvement plan of the time counting method of the slave device, a technique is provided by the patent literature 1, where the slave device has an internal timer to implement time synchronization between the master device and the slave device. However, in the technique recorded in the patent literature 1, a method of using the synchronized moment, especially data accuracy for recording some log data to the slave device are not mentioned.

The invention is provided to resolve the aforementioned problem, and is directed to a master device capable of acquiring more useful log data.

Technical means for Resolving the Problem

In order to resolve the aforementioned problem, the invention provides a master device adapted to communicate with at least one slave device for recording generation of a specified event, and the master device includes a moment acquiring element for acquiring a moment; a moment adjustment instructing element for making the slave device to synchronize a moment counted by the slave device and the moment acquired by the moment acquiring element by sending moment information corresponding to the moment acquired by the moment acquiring element; and a log receiving element for receiving a first event log from the slave device, where the first event log is information formed by associating a generation moment of the event with information for determining the event.

In order to resolve the aforementioned problem, the invention provides a control method of a master device, where the master device is adapted to communicate with at least one slave device for recording generation of specified events, and the control method of the master device includes: a moment acquiring step for acquiring a moment; a moment adjustment instructing step for making the slave device to synchronize a moment counted by the slave device and the moment acquired in the moment acquiring step by sending moment information corresponding to the moment acquired in the moment acquiring step; and a log receiving step for receiving a first event log from the slave device, where the first event log is information formed by associating a generation moment of the event with information for determining the event.

According to the aforementioned structure or method, the master device may take the moment acquired by the moment acquiring element as a reference to adjust the moment counted by the slave device. Moreover, the log receiving element may receive the first event log, where the first event log includes an event generation moment determined under a state of implementing time synchronization with the reference. Namely, the master device may acquire log data that is more useful for determining the event generation moment. Therefore, in case that a plurality of slave devices is adopted, the moments of the slave devices are also synchronized based on the reference, such that the first event log received from each of the slave devices can be compared according to a time sequence.

In an embodiment of the invention, the moment adjustment instructing element sends the moment information at a moment when the moment adjustment instructing element is capable of communicating with the slave devices, and then sends the moment information to the slave devices in a specified period.

According to the above structure, the period of producing an error between the moment counted by the slave device and the moment acquired by the moment acquiring element of the master device is suppressed to the minimum.

In an embodiment of the invention, the moment adjustment instructing element modifies the moment indicated by the moment information according to a connection relationship between the moment adjustment instructing element and the slave devices.

According to the above structure, the time synchronization implemented between the mater device and the slave device can be more accurate.

In an embodiment of the invention, the moment adjustment instructing element determines a sending period of the moment information according to a connection relationship between the moment adjustment instructing element and the slave devices.

According to the above structure, regardless of the connection relationship between the master device and the slave devices, the moment error between the master device and the slave devices can all be prevented.

The master device includes a log producing element for producing a second event log, where the second event log is information formed by associating the generation moment of an event consistent with or corresponding to the specified event with information for determining the consistent or corresponding event.

According to the above structure, the first event log and the second event log are respectively produced by the time-synchronized slave device and the master device. Therefore, the first event log and the second event log that record the event generation moments based on the same reference can be produced, and more useful log data adapted for comparison is produced.

In order to resolve the aforementioned problem, the invention provides a slave device adapted to communicate with a master device acquiring a moment, and record generation of a specified event, and the slave device includes a timer element for counting a current moment; a moment information receiving element for receiving moment information from the master device corresponding to the moment acquired by the master device; a moment adjustment element for synchronizing the moment counted by the timer element according to the moment information received by the moment information receiving element; and a log sending element for sending a first event log to the master device, where the first event log is information formed by associating a generation moment of the event with information for determining the event.

In order to resolve the aforementioned problem, the invention provides a control method of a slave device, where the slave device is adapted to communicate with a master device acquiring a moment, and record generation of a specified event. The control method of the slave device includes a time counting step for counting a current moment; a moment information receiving step for receiving moment information from the master device corresponding to the moment acquired by the master device; a moment adjustment step for synchronizing the moment counted in the time counting step according to the moment information received in the moment information receiving step; and a log sending step for sending a first event log to the master device, where the first event log is information formed by associating a generation moment of the event with information for determining the event.

According to the aforementioned structure or method, the slave device performs time synchronization based on the moment information coming from the master device. Moreover, the log sending element sends the first event log to the master device, and the first event log includes the event generation moment determined under the state of implementing time synchronization with the reference. Namely, the slave device may send log data that is more useful for determining the event generation moment.

In order to resolve the aforementioned problem, the invention provides an information processing device including a log acquiring element for acquiring a first event log and a second event log from a master device; and a combination element for producing a third event log, where the third event log is formed for combining the first event log and the second event log acquired by the log acquiring element according to a time sequence.

According to the above structure, in the first event log and the second event log, the event generation moments can be compared. Therefore, deduction of corresponding relationship and causal relationship of event generations in the master device and the slave device is easier.

In order to resolve the aforementioned problem, the invention provides an event log collecting system including the master device, the slave device and the information processing device.

According to the above structure, the event log collecting system has the same effects with that of the master device, the slave device and the information processing device.

The master device and the slave device can be implemented through a computer. In this case, the computer can be used as various elements (software elements) of the master device and the slave device, such that the master device and the slave device implemented by the computer, control procedures of the master device and the slave device, and a recording medium recording the control procedures and readable by the computer also belong to a protection scope of the invention.

Effect of the Invention

The invention has a following effect: more useful log data can be acquired.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is an example of a data structure of a master log recorded by a slave device included in the event log collecting system.

FIG. 4 is an example of a data structure of a slave log recorded by a master device included in the event log collecting system.

FIG. 5 is an example of a data structure of a combination log produced in a personal computer (PC) included in the event log collecting system.

DESCRIPTION OF EMBODIMENTS (System Overview)

First, a system structure and an outline of an event log collecting system of the present embodiment are described.

Figure 2:
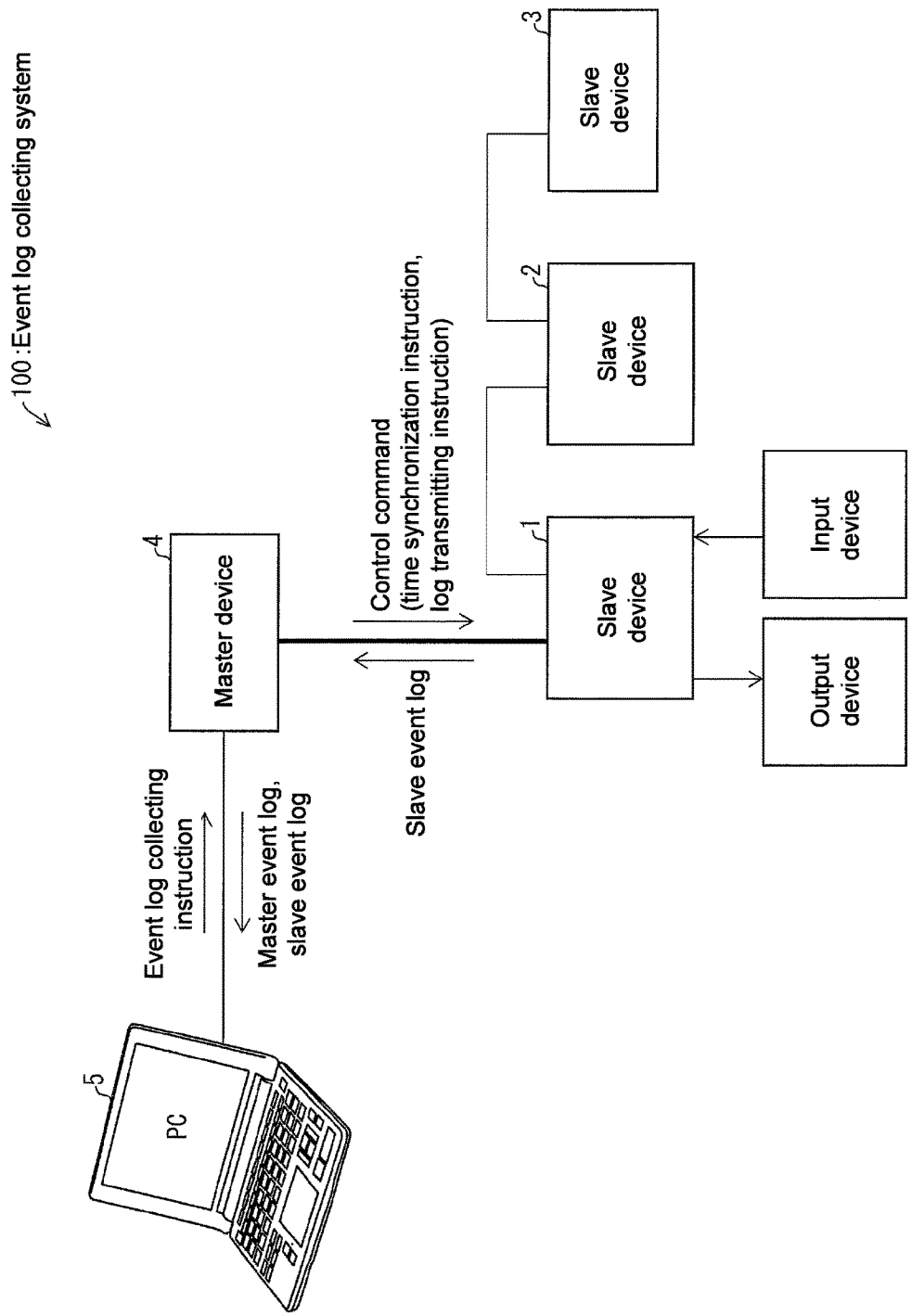
FIG. 2 is a schematic diagram of the event log collecting system.

FIG. 2 is a schematic diagram of an event log collecting system 100. The event log collecting system 100 is adapted to collect event logs recording generation of specified events and recorded in various devices after time synchronization is performed to the various devices on a network.

The event log collecting system 100 is implemented on a network where various devices are managed in centralization, and data of the various devices are collected. For example, the event log collecting system 100 is implemented on an industrial network used for managing production devices of a manufacturing plant in centralization and collecting data from the production devices. In the following description, the event log collecting system 100 implemented on the industrial network is taken as an example for description.

The event log collecting system 100 includes one or more slave devices (slave device 1-slave device 3) for collecting data from production devices and controlling the same; a master device 4 for managing the slave device in centralization; and a personal computer (PC, for example, a signal processing device) 5 for collecting data acquired from the slave devices and the master device through the master device 4. Moreover, each of the slave devices can be connected to one or more production devices, and can be connected to any one of or both of an input device (for example, a sensor, a pressing button, a limit switch, etc.) and an output device (for example, a lamp, etc., of the production device) of each of the production devices.

The PC 5 is connected to the master device 4 through a wired or wireless manner. On the other hand, the master device 4 and the slave device 1 are connected through a cable adapted for Ethernet for control automation technology (EtherCAT, registered trademark) communication, and communicate with each other by using EtherCAT communication standards. The slave device 1 and the slave device 2, and the slave device 2 and the slave device 3 are also connected by using the same type of cables, and communicate with each other by using the EtherCAT communication standards. In communication of the master device 4 and the slave devices 1-3, the master device 4 serves as an upstream side, i.e. serves as an EtherCAT master to work, and the slave devices 1-3 serve as EtherCAT slaves to work. In the following description, the communication implemented by using the EtherCAT communication standards is simply referred to as "EtherCAT communication". The slave device (the slave device 1 in FIG. 2) is properly connected to the input device or the output device through the wired or wireless manner.

Moreover, in the present embodiment, the situation that three slave devices 1-3 are connected in series to the master device 4 as that shown in FIG. 2 is taken as an example for description, though the number of the slave devices directly or indirectly connected to the master device 4 and a topology structure thereof are not specifically limited. The event log collecting system 100 may also adopt a series-like, a ring-like, a tree-like or a star-like topology structure according to collaboration or wiring situation of the slave devices.

Each of the devices is briefly described below. The master device 4 is a programmable logic controller (PLC) adapted to implement a sequence control. The master device 4 transmits a control command to the slave devices 1-3 through the EtherCAT communication, so as to control the slave devices 1-3, and receive various data from the slave devices 1-3, and implement state monitoring of the slave devices 1-3. Moreover, the master device 4 records logs of events (a master log, a second event log) generated by the master device 4.

The slave devices 1-3 are adapted to collect data from input devices such as various detection devices or measurement devices of a sensor, a pressing button, a limit switch, etc., and adapted to control output devices such as a motor, a lamp, etc. Moreover, the slave devices 1-3 respectively have a timer to measure moments. Moreover, the slave devices 1-3 record logs of events (slave logs, a first event log) generated by the slave devices or at least one of the input device and the output device connected to the slave devices.

The PC 5 is adapted to send an event log collecting instruction to the master device 4, and collect and manage the event logs (the master log and the slave logs) respectively recorded in the master device 4 and the slave devices (the slave devices 1-3 in FIG. 2) connected to the master device 4. The PC 5 provides a result of analysing or arranging the collected master log and the slave logs to a user. To be specific, the PC 5 provides a combination log formed by combining the master log and the slave logs according to a time sequence to the user. The combination log is to be described later. Moreover, the PC 5 is adapted to produce a program to be executed by the master device 4 according to an input operation of the user.

A processing flow of the event log collecting system 100 is schematically described below. When the master device 4 starts to run (a power thereof is turned on) under a state of connecting the slave devices 1-3 through a network, the number of the slave devices connected to the master device 4 is first determined. Then, the master device 4 determines a period of sending an instruction for implementing time synchronization (a time synchronization instruction) to the slave devices 1-3 according to a period of the EtherCAT communication and the number of the slave devices (three slave devices in FIG. 2). Then, the master device 4 repeatedly sends the time synchronization instruction to the slave devices 1-3 according to the determined period. To be specific, the master device 4 produces frame (EtherCAT frame, which is simply referred to as frame hereinafter) containing the time synchronization instruction and complied with the EtherCAT communication standards for transmitting to the slave devices 1-3.

The frame transmitted from the mater device 4 to the slave device 1 sequentially passes through the slave devices 1-3. Now, each of the slave devices reads the time synchronization instruction contained in the frame, and each of the slave devices performs corresponding processing according to the time synchronization instruction. Moreover, the frame is transmitted in a sequence opposite to that of a sending path, i.e. a sequence of the slave device 3, the slave device 2, the slave device 1 and the master device 4. The master device 4 receives the return frame. In this way, processing of the frame is completed. The slave devices 1-3 perform time synchronization to the timers of the slave devices when receiving the time synchronization instruction from the master device 4. Moreover, processing related to the time synchronization is described later.

Then, the PC 5 instructs the master device 4 to collect logs according to an input operation of the user, etc. When the master device 4 receives the instruction, the master device 4 transmits the instruction for transmitting the slave logs (a log transmitting instruction) to the slave devices 1-3. Moreover, a transmission method of the log transmitting instruction is the same with that of the time synchronization instruction. When the slave devices 1-3 receive the log transmitting instruction, the slave devices 1-3 upload the slave logs to the frame for transmitting. In this way, the master device 4 located at an upstream of the EtherCAT communication receives the slave logs contained in the frame.

The master device 4 sends the received slave logs and the master log recorded by itself to the PC 5. The PC 5 combines the slave logs with the master log to produce a combination log (a third event log) arranged in a time sequence, and displays the same to the user.

In this way, the event log collecting system 100 may synchronize the time of the master device 4 and the slave devices 1-3, so as to compare a moment recorded in the master log with a moment recorded in the slave logs. Therefore, a following effect is achieved: a corresponding relationship or a causal relationship of event generation of each of the device can be easily deduced. Namely, in the event log collecting system 100, event generation of the master device 4 and the slave devices 1-3 can be recorded as more useful log data.

(Main Structures of each of the Devices)

Figure 1:
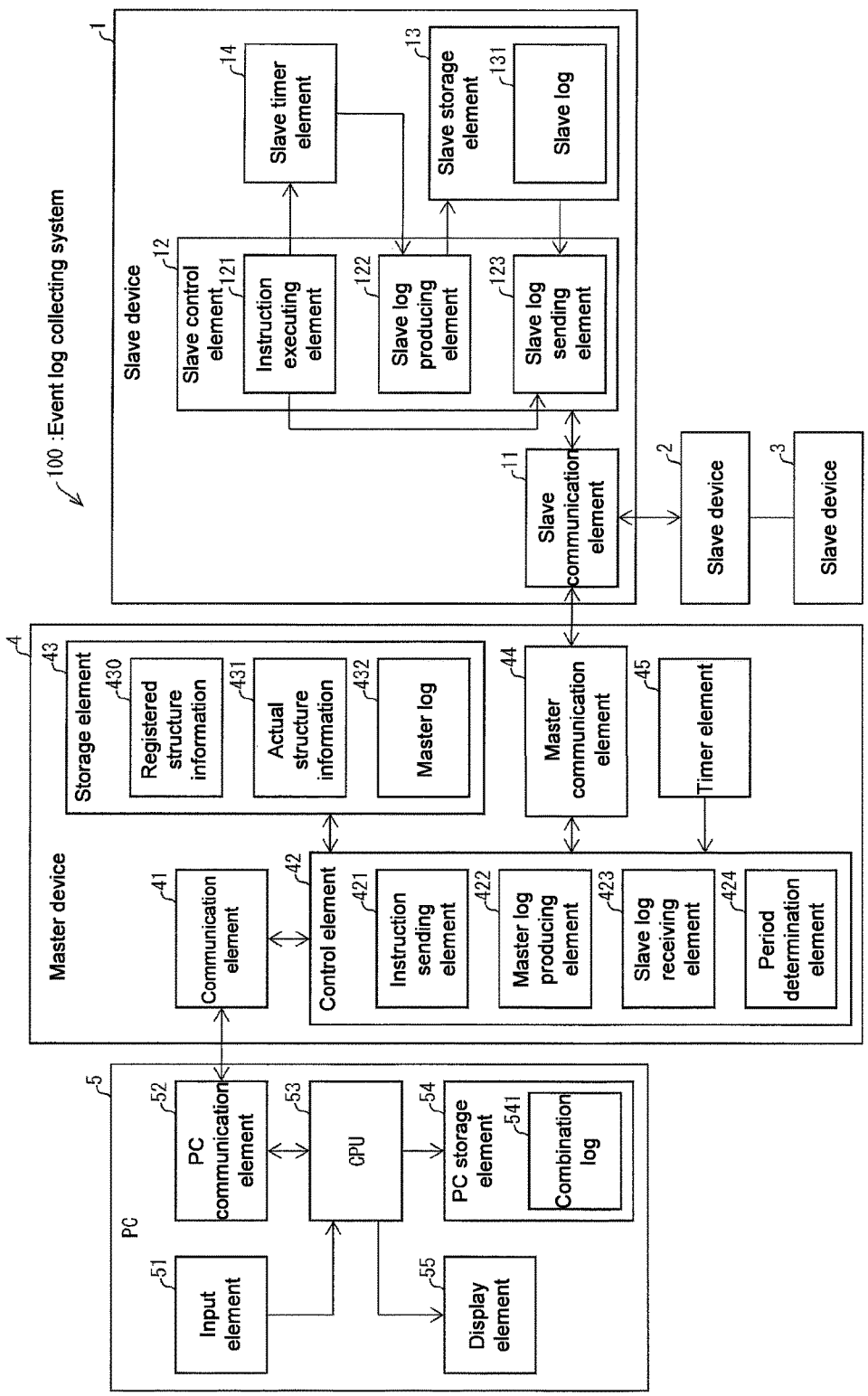
FIG. 1 is a block diagram illustrating main structures of devices included in an event log collecting system according to a first embodiment of the invention.

The main structures of the master device 4, the slave devices 1-3 and the PC 5 included in the event log collecting system 100 are described below. FIG. 1 is a block diagram illustrating main structures of the devices included in the event log collecting system 100 according to the present embodiment of the invention. Moreover, since the slave device 2 and the slave device 3 have the same structure with that of the slave device 1, illustration and description of functional blocks thereof are not repeated.

(Main Structure of the Master Device 4)

The master device 4 includes a communication element 41, a control element (a log producing element) 42, a storage element 43, a master communication element 44 and a timer element 45. The communication element 41 is a communication unit used for communicating with the PC 5. The master communication element 44 is a communication unit used for communicating with the slave device 1 through the EtherCAT communication. The timer element 45 acquires a moment, which is a real time clock (RTC) of the slave device 1. The timer element 45 sends information representing a counted moment (moment information) to the control element 42. Moreover, the master device 4 may also acquire the moment information from the PC 5 when the master device 4 needs the moment information, and in this case, the timer element 45 can be omitted.

The control element 42 performs unified control to the master device 4. The control element 42 receives a program to be executed by the control element 42 from the PC 5. Moreover, the control element 42 receives network structure information (registered structure information) of the EtherCAT communication between the master device 4 and the slave devices 1-3 that is registered in the PC 5, and pre-stores the same in the storage element 43. Moreover, the so-called "network structure information" at least includes information related to the number of the slave devices connected to the master device. Further, the network structure information may also include information related to the types of each of the slave devices. Moreover, the control element 42 pre-receives a setting of a communication period of the EtherCAT communication from the PC 5.

To be specific, the control element 42 includes an instruction sending element (a moment adjustment instructing element) 421, a master log producing element 422, a slave log receiving element (log receiving element) 423 and a period determination element 424.

The period determination element 424 determines a period of time synchronization according to the network structure of the master device 4 and the slave devices. The period determination element 424 confirms a flag stored in the storage element 43 and representing whether to perform the time synchronization when the master device 4 starts to run (a power thereof is turned on). The period determination element 424 determines the network structure information of the master device 4 and the slave devices 1-3 in case that the flag represents to perform the time synchronization, and takes the same as an actual network structure information (an actual structure information 431) for storing in the storage element 43.

The period determination element 424 determines the slave devices 1-3 implementing the time synchronization (objects where the time synchronization instruction is sent to) based on the registered structure information 430 and the actual structure information 431. Moreover, the period determination element 424 determines a sending period (a time interval) of the time synchronization instruction according to the setting of the communication period of the EtherCAT communication that is received from the PC 5 by the control element 42 and the number of the slave devices implementing the time synchronization.

The number of the slave devices on the event log collecting system 100 when the master device 4 sends the time synchronization instruction to the specific slave device (by using one-to-one communication) is set to n, and a period that each of the slave devices performs the time synchronization (a period of receiving the time synchronization instruction) is set to t1. In this case, the master device 4 sends the time synchronization instruction to each of the different slave devices in a time interval of t1/n. For example, it is assumed that the three slave devices 1-3 respectively perform the time synchronization every 60 minutes. In this case, the master device 4 sends the time synchronization instruction to any one of the slave device every 20 minutes. Moreover, an ideal example that the period determination element 424 determines the sending period is described later.

Moreover, in case that the flag represents not to perform the time synchronization, the period determination element 424 may not determine the actual structure information 431 and the sending period. Moreover, the period determination element 424 may also confirm the flag of the storage element 43 in a specified time interval not only when the power of the master device 4 is turned on, and determines whether to perform the time synchronization according to a state of the flag. Further, the period determination element 424 may determine the sending period each time when the power of the master device 4 is turned on, though the period determination element 424 may also directly adopt the previously determined sending period (which can also be pre-stored in the storage element 43) in case that the registered structure information 430 and the actual structure information 431 are not varied.

The instruction sending element 421 produces a frame containing the time synchronization instruction according to the sending period determined by the period determination element 424, and sends the frame to the slave devices 1-3. Moreover, the instruction sending element 421 produces a frame containing a log transmitting instruction in case that the control element 42 receives an instruction for collecting logs (a log collecting instruction) from the PC 5, and sends the frame to the slave devices 1-3.

The time synchronization instruction is described in detail below. The time synchronization instruction includes a control command for instructing the slave device to perform the time synchronization and the moment information acquired from the timer element 45 (or the PC 5). The instruction sending element 421 takes the control command for instructing the time synchronization as an event for producing into the frame, and adds the moment information to serve as a time stamp of the event.

The master log producing element 422 produces a master log (a second event log) 432 when the master device 4 produces the event, and stores the master log into the storage element 43. The master log 432 is information formed by associating a generation moment of the event with information for determining the event generated in the master device 4. FIG. 5 is provided to describe an embodiment of the master log 432. FIG. 5 is a diagram of an example of a data structure of the master log 432. As shown in FIG. 5, the master log 432 is a log associating generation moments (moments of the master device 4) of the events with names (event names) of the generated events. Moreover, the aforementioned moments of the master device 4 refer to moments counted by the timer 45 (or moments received from the PC 5).

Moreover, a data format of the master log 432 is applicable as long as the master log 432 at least includes information capable of determining the generated event and the generation moment of the event, and is not limited to the format shown in FIG. 3. For example, in the master log 432, a code (an event code) capable of uniquely determining the event can be recorded together with the event name (or by replacing the event name), or the master log 432 may contain information such as a significance of the event, a type (a group) of the event, a generation source of the event, etc.

The slave log receiving element 423 receives slave logs 131 contained in the frames transmitted by the slave devices 1-3 through the master communication element 44. When the slave log receiving element 423 receives the slave logs 131, the slave log receiving element 423 reads the master log 432 from the storage element 43, and sends the master log 432 and the slave logs 131 to the PC 5 through the communication element 41.

The storage element 43 saves the flag indicating whether to perform the time synchronization, the registered structure information 430 received from the PC 5 by the control element 42, the actual structure information 431 determined by the period determination element 424 and the master log produced by the master log producing element 422. Moreover, the storage element 43 may also save the slave logs 131 received from the slave devices 1-3. Moreover, the sending period of the time synchronization instruction determined by the period determination element 424 may serve as a setting value for storing in the storage element 43, and may also serve as an internal variable for being held by the control element 42.

(Main Structure of the Slave Device 1)

The slave device 1 includes a slave communication element 11, a slave control element (moment information receiving element) 12, a slave storage element 13 and a slave timer element (timer element) 14. The slave communication element 11 is a communication unit used for communicating with the master device 4 and the other slave devices (for example, the slave device 2 in FIG. 1 and FIG. 2) through the EtherCAT communication. The slave storage element 13 is used for storing the slave logs. The slave timer element 14 is a timer used for measuring moments. The slave timer element 14 sends the moment information to the slave control element 12.

The slave control element 12 performs unified control to the slave device 1. The slave control element 12 receives a control command from the master device 4 through the slave communication element 11. To be specific, the slave control element 12 includes an instruction executing element (a moment acquiring element, a moment adjusting element) 121, a slave log producing element 122 and a slave log sending element (log sending element) 123.

The instruction executing element 121 executes the control command received from the slave control element 12. To be specific, in case that the control element 12 receives the time synchronization instruction, the instruction executing element 121 synchronizes a time of the timer of the slave timer element 14 with a moment represented by the moment information contained in the time synchronization instruction. Namely, the instruction executing element 121 makes the moment of the slave timer element 14 to be consistent with the moment represented by the moment information added as a time stamp of the time synchronization instruction. Moreover, in case that the slave control element 12 receives the log transmitting instruction, the instruction executing element 121 instructs the slave log sending element 123 to send the slave logs.

The slave log producing element 122 detects generation of an event when at least one of the slave device 1, the input device and the output device connected to the slave device 1 produces a specified event, and produces a slave log (a first event log) 131 for storing in the slave storage element 13.

The slave log 131 is information formed by associating the generation moment of the event with information for determining the event generated in at least one of the slave device 1, the input device and the output device connected to the slave device 1. FIG. 4 is provided to describe an embodiment of the slave log 131. FIG. 4 is an example of a data structure of the slave log 131. As shown in FIG. 4, the slave log 131 is a log associating generation moments (moments of the slave devices 1-3) of the events with event names. Moreover, the aforementioned moments of the slave devices 1-3 are not count values of internal clocks of the slave devices 1-3, but are moments measured by the slave timer element 14.

Moreover, a data format of the slave log 131 is applicable as long as the slave log 131 at least includes information capable of determining the generated event and the generation moment of the event, and is not limited to the format shown in FIG. 4. For example, in the slave log 131, an event code can be recorded together with the event name (or by replacing the event name), or the slave log 131 may contain information such as a significance of the event, a group of the event, a generation source of the event, etc.

The slave log sending element 123 reads the slave log 131 from the slave storage element 13 according to an instruction of the instruction executing element 121, and transmits the slave log 131 to the master device 4 through the slave communication element 11.

(Main Structure of the PC 5)

The PC 5 includes an input element 51, a PC communication element 52, a central processing unit (CPU, a log acquiring element, a combination element) 53, a PC storage element 54 and a display element 55. The input element 51 is, for example, a keyboard or a mouse, etc., that is adapted to receive an input operation from the user. The display element 55 is, for example, a display, etc., that is adapted to display a processing result of the CPU 53. The PC communication element 52 is a device adapted to communicate with the master device 4. Moreover, the PC 5 may also have general members included in a general PC.

The CPU 53 performs unified control to the PC 5. The CPU 53 produces a program to be executed by the master device 4 according to an input operation performed to the input element 51 by the user, and sends the program to the master device 4 through the PC communication element 52. Moreover, the CPU 53 sends a log collecting instruction to the master device 4 through the PC communication element 52. Moreover, the CPU 53 acquires the master log 432 and the slave logs 131 from the master device 432 executing the log collecting instruction. The CPU 53 produces a combination log 541 by combining the acquired master log 432 and the slave logs 131, and stores the combination log 541 in the PC storage element 54.

The combination log 541 is a log formed by combining (merging) the master log 432 and the slave logs 131, and is information associating the generation moment of the event with information for determining the generated event and information for determining a generation source of the event. An embodiment of the combination log 541 is described below with reference of FIG. 5.

FIG. 5 is an example of a data structure of the combination log 541. As shown in FIG. 5, the combination log 541 is a log associating the generation source (a name of the device generating the event, i.e. any one of the slave devices 1-3) of the event and the generation moment of the event with the event name. Moreover, the so-called "generation moment" represents a moment counted by each of the slave devices 1-3 (the moments of the slave devices 1-3 in FIG. 4) in case that the generation source is one of the slave devices 1-3, and represents a moment counted by the master device 4 (the moment of the master device 4 in FIG. 3) in case that the generation source is the master device 4. The CPU 53 reads the combination log 541 from the PC storage element 54 and displays the same on the display element 55 when the user instructs display of the combination log 541 through the input element 51.

The PC storage element 54 saves various data of the PC 5. The PC storage element 54 at least saves the combination log 541. Moreover, the PC storage element 54 may also save the master log 432 and the slave logs 131 received from the master device 4.

(Processing Flow)

Finally, a time synchronization processing flow of the master device 4 and the slave devices 1-3 and an event log collection processing flow of the PC 5, the master device 4 and the slave devices 1-3 are described with reference of FIG. 6 and FIG. 7. Moreover, the processing flow of the slave device 2 and the slave device 3 located at the downstream of the slave device 1 is also the same, so that only the processing flow related to the slave device 1 is recorded in FIG. 6 and FIG. 7.

(Time Synchronization Processing)

Figure 6:
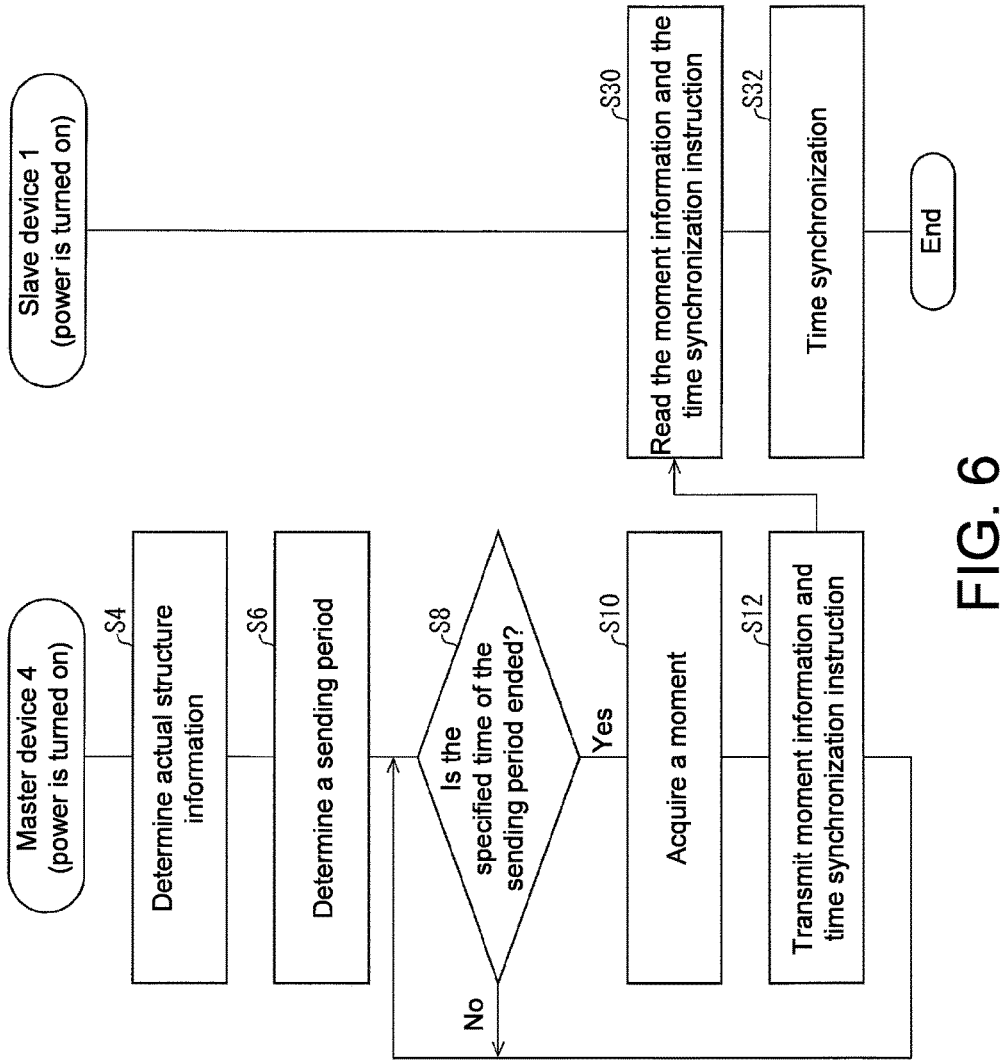
FIG. 6 is a flowchart illustrating a time synchronization processing flow of a master device and a slave device.

FIG. 6 is a flowchart illustrating a time synchronization processing flow. When the power of the master device 4 is turned on in case that the master device 4 is connected to an industrial network running the production devices, the master device 4 starts a sequential control of each of the slave devices. Now, the period determination element 424 of the master device 4 confirms a flag of the storage element 43, and determines the actual structure information 431 in case that the flag represents to perform the time synchronization (S4). Moreover, the period determination element 424 determines a sending period of a time synchronization instruction according to the registered structure information 430 and the actual structure information 431 pre-received from the PC 5 and stored in the storage element 43 (S6). The instruction sending element 421 sends the time synchronization instruction in the sending period determined by the period determination element 424. To be specific, the instruction sending element 421 stands by until the specified time of the sending period is ended ("no" in S8), when the specified time is ended ("yes" in S8), a moment provided by the timer element 45 is acquired (S10, a moment acquiring step), and the moment information and the time synchronization instruction are included in a frame for transmitting to the slave devices 1-3 (S12, a moment adjustment instructing step).

On the other hand, the slave timer element 14 of each of the slave devices 1-3 keeps counting a current moment (a time counting step). The slave control element 12 of each of the slave devices 1-3 reads the time synchronization instruction and the moment information from the frame received by the slave communication element 11 (S30, the moment information receiving step), and when the instruction executing element 121 receives the time synchronization instruction and the moment information, the instruction executing element 121 synchronizes a time of the slave timer element 14 for conforming with the moment information (S32, a moment adjustment step). Then, the instruction sending element 421 of the master device 4 repeatedly sends the time synchronization instruction to the slave devices 1-3 (S8-S12) in the sending period (a time interval) determined by the period determination element 424. In this way, the moment provided by the slave timer element 14 of each of the slave devices 1-3 periodically takes the time synchronization, so as to be consistent with the moment provided by the timer element 45 of the master device 4.

Moreover, data communication of the PLC serving as the master device 4 (for example, an instruction used for coordination control of the production devices or exchange of input data coming from the input device, etc.) is carried out in a large amount in a very short period compared to the sending/receiving period of the time synchronization instruction. In other words, in order to implement a large amount and high-speed data communication, the EtherCAT communication is adopted. In the industrial network executing the large amount of data exchange in the very short period, as described above, by properly determining the sending period to perform time synchronization processing, the time synchronization can be performed in a period and timing that have no influence on the data exchange between the PLC (the master device 4) and the slave devices 1-3.

(Event Log Collection Processing)

Figure 7:
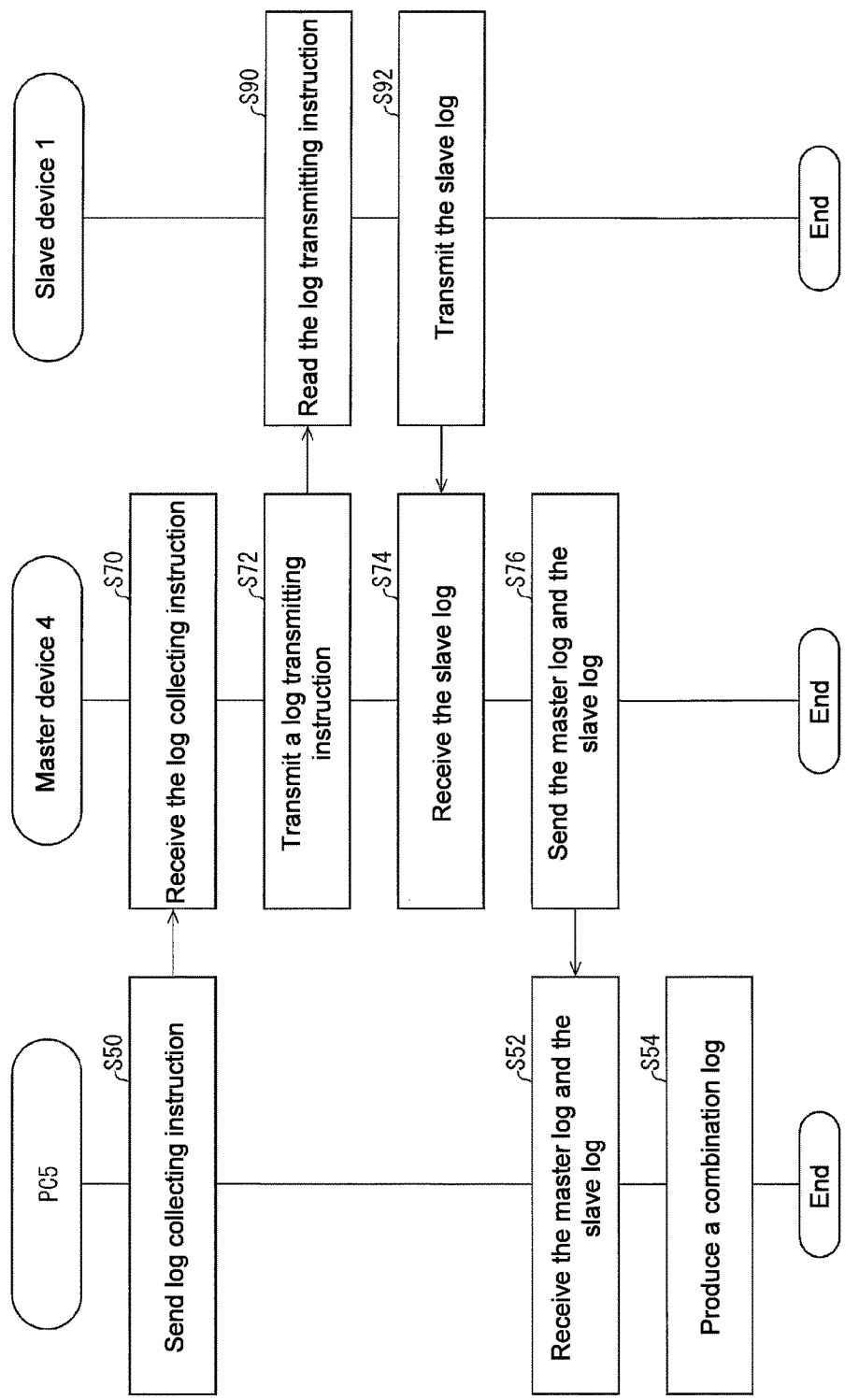
FIG. 7 is a flowchart illustrating an event log collection processing flow of the PC, the host device and the slave device.

FIG. 7 is a flowchart illustrating an event log collection processing flow. As described above, the CPU 53 of the PC 5 sends an instruction for collecting logs (a log collecting instruction) to the master device 4 performing the time synchronization processing (running on the industrial network) (S50). The control element 42 receives the log collecting instruction through the communication element 41 (S70). When the control element 42 receives the log collecting instruction, the instruction sending element 421 sends a frame containing a log transmitting instruction to the slave devices 1-3 (S72). The slave control element 12 of each of the slave devices 1-3 reads the log transmitting instruction from the frame received by the slave communication element 11 (S90). When the instruction executing element 121 receives the log transmitting instruction, the instruction executing element 121 instructs the slave log sending element 123 to send the slave log. The slave log sending element 123 reads the slave log 131 from the slave storage element 13 according to the instruction of the instruction executing element 121, and transmits the same to the master device 4 (S92, a log sending step).

When the slave log receiving element 423 of the master device 4 respectively receives the slave logs 131 from the slave devices 1-3 (S74, a log receiving step), the slave log receiving element 423 reads the master log 432 from the storage element 43, and sends the master log 432 and the slave logs 131 to the PC 5 (S76).

When the CPU 53 of the PC 5 receives the master log 432 and the slave logs 131 (S52), the CPU 53 produces the combination log 541 formed by combining the acquired master log 432 and the slave logs 131, and saves the combination log 541 to the PC storage element 54 (S54).

For example, in case that the master log 432 shown in FIG. 3 is combined with the slave logs 131 shown in FIG. 4, the combination log 541 includes data shown in FIG. 5. A field of "generation moment" of the combination log 541 shown in FIG. 5 saves moments respectively measured by the master device 4 and the slave devices 1-3. However, since the master device 4 and the slave devices 1-3 periodically perform the time synchronization processing shown in FIG. 6, the moments saved in the field of "generation moment" can be moments where errors of the moments are suppressed to the minimum and moments counted based on a same reference (the time synchronization is performed). Therefore, whether corresponding event is normally generated in the master device 4 and the slave device (1 and 2) can be determined.

To be specific, it is assumed that the master device 4 produces a sending event "AAAAAA" for sending a certain instruction, and the slave devices 1-3 produce an execution event "aaaaaa" for executing a control processing corresponding to the above instruction. Now, as shown by a first row-a third row indicated by a thick frame in the combination log 541 of FIG. 5, by referring to the event generation moments of various devices, it can be determined whether the instruction is normally executed. Conversely, if none of the slave devices has a generation record of the event "aaaaaa", or a time lag is occurred when the event "aaaaaa" is produced, it can be deduced that some obstacles have been generated in tranceiving or execution of the instruction.

Moreover, a corresponding relationship or causal relationship of the events can be deduced according to the generation moments of the events in the combination log 541. Regarding the example of FIG. 5, even in case that the event "AAAAAA" and the event "aaaaaa" have no special association, if the event "aaaaaa" is generated in any one of the slave devices 1-3 just after the event "AAAAAA" of the master device 4 is generated, it can be accordingly deduced that the event "aaaaaa" (for example, a reception error or execution error in the slave devices 1-3) is caused in any one of the slave devices 1-3 due to generation of the event "AAAAAA" in the master device 4 (for example, a sending error of the master device 4).

Therefore, by performing the time synchronization processing and the log collecting process, the event log collecting system 100 of the present embodiment may collect the event logs recorded under the state that the moments of the master device 1 and the slave devices 1-3 are consistent with the same reference. Namely, the event log collecting system 100 is capable of acquiring more useful log data.

(Periods of the Time Synchronization Instruction and the Log Transmitting Instruction)

Moreover, in the event log collecting system 100 of the present embodiment, the sending period of the time synchronization instruction is ideally specified as that a moment error of the master device 4 and the slave devices 1-3 is controlled within a specified range. An acceptable error range of the time synchronization and the ideal specification of the sending range of the time synchronization instruction are described below.

Ideally, the moment error of the master device 4 and the running slave devices 1-3 is smaller than a minimum unit of the moments (1 second in case of FIG. 3-FIG. 5) recorded in various event logs (the slave logs 131, the master log 432 and the combination log 541). If the time synchronization error of the master device 4 and the slave devices 1-3 is smaller than the minimum unit of the moments recorded in various event logs, the generation moment of the sending event of the control command in the master device 4 is consistent with the generation moment of the execution event of the control command in the slave devices 1-3. Therefore, deduction of the corresponding relationship or causal relationship of the various events in the combination log 541 becomes easier.

Moreover, ideally, the sending period of the time synchronization instruction determined by the period determination element 424 of the master device 4 is specified as that the moment error is always smaller than the minimum unit of the moments (1 second in case of FIG. 3-FIG. 5) recorded in various event logs. To be specific, the instruction sending element 421 sends the time synchronization instruction in a period that execution of the tune synchronization processing of each of the slave devices is performed in a period shorter than once per hour. In this way, the moment error can be controlled to be substantially within 1 second.

Moreover, ideally, the instruction sending element 421 sends the time synchronization instruction to each of the slave devices at the moment once each of the slave devices is in a state adapted for communication, and thereafter, the instruction sending element 421 sends the time synchronization instruction in the sending period determined by the period determination element 424. This is because that when the slave device is in the sate adapted for communication, i.e. when a slave device is newly added to the event log collecting system 100 and the slave device starts to run, if the time synchronization is not performed as soon as possible, when the moment of the slave timer element 14 and the moment of the timer element 45 have an error, it is hard to determine a corresponding relationship or a causal relationship between the master log and the slave log. By sending the time synchronization instruction to each of the slave devices once each of the slave devices is in the sate adapted for communication, a period for generating the moment error between the master device 4 and the slave devices can be suppressed to the minimum.

Accordingly, the sending period of the time synchronization instruction can be determined according to a topology structure (a connection relationship) of the master device 4 and the slave devices 1-3. Especially, the sending period of the time synchronization instruction is ideally set to be: the more the number of the slave devices is, or the more complicate the connection structure of the slave devices is, the shorter the sending period is set to be. This is because that if hundreds of the slave devices are connected in series or a complicated connection structure is adopted, even if the master device 4 transmits the time synchronization instruction, before the time synchronization instruction reaches the endmost slave device, there is a possibility that an error such as frame breakage may occur, such that the time synchronization cannot be normally carried out.

Moreover, the moment information added as a time stamp of the time synchronization instruction, i.e. the moment serving as the reference of the time synchronization in the slave devices 1-3 can also be modified according to the topology structure of the master device 4 and the slave devices 1-3. Especially and ideally, the more the number of the slave devices is, or the more complicate the connection structure of the slave devices is, the later moment the moment information is modified compared to the moment measured by the timer element 45. This is because that if hundreds of the slave devices are connected in series or a complicated connection structure is adopted, even if the master device 4 transmits the time synchronization instruction, before the time synchronization instruction reaches the endmost slave device, there is a possibility that a time lag is occurred. By pre-adding the modification corresponding to the time lag to the moment measured by the timer element 45, and adding the modified moment information as the time stamp, the time error between the master device 4 and the slave devices located at a downstream of the communication (especially around the end) can be prevented, so as to implement more accurate time synchronization.

(Variation)

Moreover, the master device 4 may also send the log transmitting instruction to the slave devices 1-3 in a specified period to collect the slave logs without receiving the instruction from the PC 5. In this case, the spirit of the invention is met as long as the slave log receiving element 423 of the master device 4 pre-stores the acquired slave logs 131 to the storage element 43, and altogether sends the slave logs 131 and the master log 432 to the PC 5 when the PC 5 instructs to collect the event logs. Therefore, in this case, the sending period of the log transmitting instruction can also be determined by the period determination element 424 according to the registered structure information 430 and the actual structure information 431.

(Implementation through Software)

Control blocks of the slave devices 1-3, the master device 4 and the PC 5 (especially the slave control element 12, the control element 42 and the CPU 53) can be implemented by logic circuits (hardware) formed on an integrated circuit (IC (chip)), and can also be implemented by using a central processing unit (CPU) through software.

In the later case, the slave devices 1-3, the master device 4 and the PC 5 respectively have a CPU adapted to execute commands of software (i.e. programs) capable of implementing various functions, a read only memory (ROM) or a storage device (referred to as a recording medium) recording the programs and various data that can be read by a computer (or the CPU), a random access memory (RAM) for spreading the programs, etc. Moreover, the programs recorded in the recording medium can be read and executed by the computer (or the CPU) to achieve the purpose of the invention. The recording medium can be implemented by a non-temporary physical medium, for example, a tape, a disk, a card, a semiconductor memory, a programmable logic circuit, etc. Moreover, the program can be provided to the computer through any transmission medium (a communication network or a radio wave, etc.) capable of transmitting the program. In addition, the data embodying the program and embedded in carriers can be implemented in form of signals through teletransmission.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A master device, adapted to communicate with at least one slave device for recording generation of a specified event, and the master device comprising:
    a moment acquiring element, acquiring a moment;
    a moment adjustment instructing element, making the slave device to synchronize a moment counted by the slave device and the moment acquired by the moment acquiring element by sending a moment information corresponding to the moment acquired by the moment acquiring element; and
    a log receiving element, receiving a first event log from the slave device, wherein the first event log is an information formed by associating a generation moment of the event with an information for determining the event.

2. The master device as claimed in claim 1, wherein the moment adjustment instructing element sends the moment information at a moment when the moment adjustment instructing element is capable of communicating with the slave devices, and then sends the moment information to the slave devices in a specified period.

3. The master device as claimed in claim 2, wherein the moment adjustment instructing element determines a sending period of the moment information according to a connection relationship between the moment adjustment instructing element and the slave devices.

4. The master device as claimed in claim 1, wherein the moment adjustment instructing element modifies a moment indicated by the moment information according to a connection relationship between the moment adjustment instructing element and the slave devices.

5. The master device as claimed in claim 1, further comprising:
    a log producing element, producing a second event log, wherein the second event log is an information formed by associating a generation moment of an event consistent with or corresponding to the specified event with an information for determining the event consistent with or corresponding to.

6. A control program, adapted to control a computer to function as the master device as claimed in claim 1, wherein the control program is adapted to control the computer to function as the moment acquiring element, the moment adjustment instructing element and the log receiving element.

7. A slave device, adapted to communicate with a master device for acquiring a moment, and record generation of a specified event, and the slave device comprising:
    a timer element, counting a current moment;
    a moment information receiving element, receiving a moment information from the master device, corresponding to the moment acquired by the master device;
    a moment adjustment element, synchronizing the moment counted by the timer element according to the moment information received by the moment information receiving element; and
    a log sending element, sending a first event log to the master device, wherein the first event log is an information formed by associating a generation moment of the event with an information for determining the event.

8. A control program, adapted to control a computer to function as the slave device as claimed in claim 7, wherein the control program is adapted to control the computer to function as the timer element, the moment information receiving element, the moment adjustment element and the log sending element.

9. An information processing device, comprising:
    a log acquiring element, acquiring the first event log and the second event log from the master device as claimed in claim 5; and
    a combination element, producing a third event log, wherein the third event log is formed for combining the first event log and the second event log acquired by the log acquiring element according to a time sequence.

10. An event log collecting system, comprising:
the master device as claimed in claim 5;
a slave device, adapted to communicate with the master device acquiring the moment, and record generation of the specified event, and the slave device comprising:
a timer element, counting a current moment;
a moment information receiving element, receiving the moment information from the master device, corresponding to the moment acquired by the master device;
a moment adjustment element, synchronizing the moment counted by the timer element according to the moment information received by the moment information receiving element; and
a log sending element, sending a first event log to the master device, wherein the first event log is an information formed by associating a generation moment of the event with an information for determining the event; and
an information processing device, comprising:
a log acquiring element, acquiring the first event log and the second event log from the master device; and
a combination element, producing a third event log, wherein the third event log is formed for combining the first event log and the second event log acquired by the log acquiring element according to a time sequence.

11. A control method of a master device, wherein the master device is adapted to communicate with at least one slave device for recording generation of a specified event, the control method of the master device comprising:
a moment acquiring step, acquiring a moment;
a moment adjustment instructing step, making the slave device to synchronize a moment counted by the slave device and the moment acquired in the moment acquiring step by sending a moment information corresponding to the moment acquired in the moment acquiring step; and
a log receiving step, receiving a first event log from the slave device, wherein the first event log is an information formed by associating a generation moment of the event with an information for determining the event.

12. A control method of a slave device, wherein the slave device is adapted to communicate with a master device acquiring a moment, and record generation of a specified event, and the control method of the slave device comprising:
a time counting step, counting a current moment;
a moment information receiving step, receiving a moment information from the master device, corresponding to the moment acquired by the master device;
a moment adjustment step, synchronizing the moment counted in the time counting step according to the moment information received in the moment information receiving step; and
a log sending step, sending a first event log to the master device, wherein the first event log is an information formed by associating a generation moment of the event with an information for determining the event.

* * * * *